(12) United States Patent
Hwang et al.

(10) Patent No.: US 11,299,838 B2
(45) Date of Patent: Apr. 12, 2022

(54) WASHING MACHINE AND CLOUD SERVER SETTING FUNCTION BASED ON OBJECT SENSING USING ARTIFICIAL INTELLIGENCE, AND METHOD FOR SETTING FUNCTION

(71) Applicant: LG ELECTRONICS INC., Seoul (KR)

(72) Inventors: Sung Mok Hwang, Seoul (KR); Sang Yun Kim, Seoul (KR); Yun Sik Park, Seoul (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 16/354,691

(22) Filed: Mar. 15, 2019

(65) Prior Publication Data
US 2019/0284743 A1      Sep. 19, 2019

(30) Foreign Application Priority Data

Mar. 15, 2018   (KR) .................. 10-2018-0030456

(51) Int. Cl.
*D06F 33/00*      (2020.01)
*D06F 33/47*      (2020.01)
(Continued)

(52) U.S. Cl.
CPC .............. *D06F 33/47* (2020.02); *D06F 34/18* (2020.02); *G05B 13/027* (2013.01); *G06N 3/04* (2013.01); *D06F 23/04* (2013.01); *D06F 33/48* (2020.02); *D06F 34/04* (2020.02); *D06F 2103/02* (2020.02); *D06F 2103/04* (2020.02); *D06F 2103/24* (2020.02); *D06F 2103/26* (2020.02); *D06F 2103/44* (2020.02); *D06F 2105/46* (2020.02)

(58) Field of Classification Search
CPC ...................................................... D06F 33/00
See application file for complete search history.

(56) References Cited

U.S. PATENT DOCUMENTS 5,172,490 A    12/1992   Tatsumi et al.
8,682,733 B2    3/2014   Ebrom et al.
(Continued)

FOREIGN PATENT DOCUMENTS

CN    104250907    12/2014
CN    106702667     5/2017
(Continued)

OTHER PUBLICATIONS

Extended European Search Report in European Application No. 19163129.0, dated Aug. 21, 2019, 12 pages.
(Continued)

*Primary Examiner* — Jason Y Ko
(74) *Attorney, Agent, or Firm* — Fish & Richardson P.C.

(57) ABSTRACT

A washing machine and at least one server that set functions of the washing machine based on object sensing using artificial intelligence, and a setting method thereof. The washing machine that sets functions based on object sensing produces information on setting of a wash course adequate for laundry on the basis of the height, image, and weight of the laundry, physical information or electrical information generated during a wash or receives the information from the at least one server and operates.

13 Claims, 12 Drawing Sheets

(51) Int. Cl.
    *G05B 13/02*     (2006.01)
    *G06N 3/04*     (2006.01)
    *D06F 34/18*     (2020.01)
    *D06F 23/04*     (2006.01)
    *D06F 103/02*     (2020.01)
    *D06F 103/04*     (2020.01)
    *D06F 103/24*     (2020.01)
    *D06F 103/26*     (2020.01)
    *D06F 103/44*     (2020.01)
    *D06F 105/46*     (2020.01)
    *D06F 34/04*     (2020.01)
    *D06F 33/48*     (2020.01)

(56) References Cited

U.S. PATENT DOCUMENTS

| | | | |
|---|---|---|---|
| 2010/0205823 | A1 | 8/2010 | Ashrafzadeh et al. |
| 2018/0038037 | A1* | 2/2018 | Hui .................... D06F 34/22 |
| 2019/0264372 | A1 | 8/2019 | Kessler et al. |

FOREIGN PATENT DOCUMENTS

| | | |
|---|---|---|
| CN | 107574625 | 1/2018 |
| DE | 102016212984 | 1/2018 |
| KR | 1020050050260 | 5/2005 |
| KR | 101789690 | 10/2017 |
| TW | 227583 | 8/1994 |
| WO | WO0146509 | 6/2001 |

OTHER PUBLICATIONS

CN Office Action in Chinese Appln. No. 201910197840.4, dated Feb. 5, 2021, 18 pages (with English translation).

MyungHun et al., "Automatic Washing Methods for the Clothes Using Deep Learning," Korea Information Science Society, dated Dec. 2017, 5 pages (with English abstract).

* cited by examiner

FIG. 8
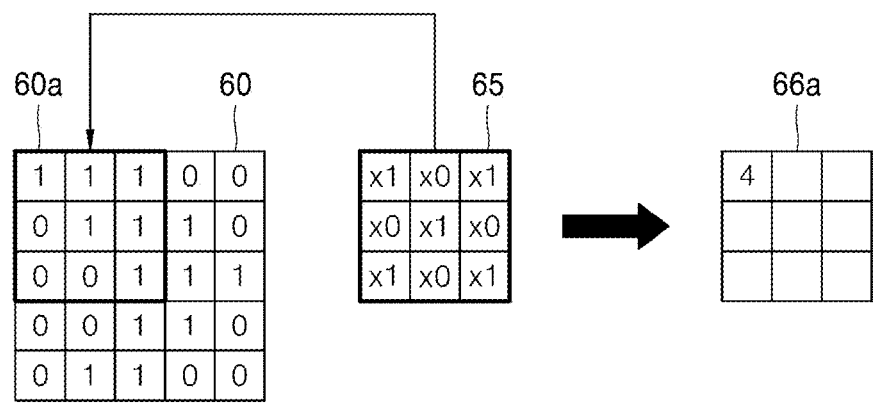
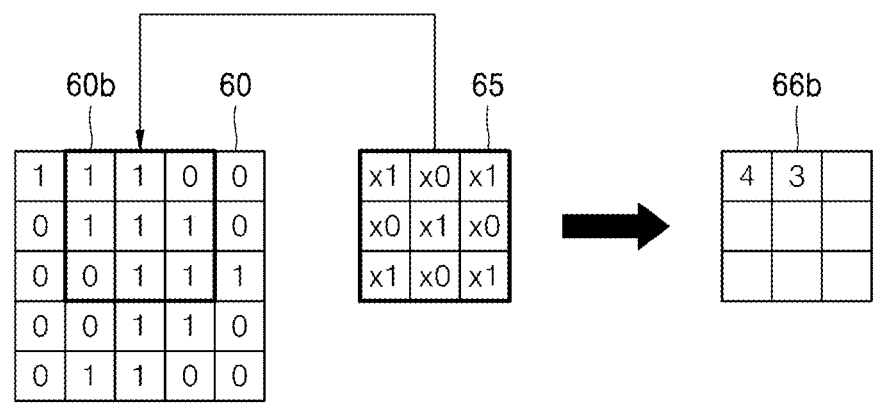

WASHING MACHINE AND CLOUD SERVER SETTING FUNCTION BASED ON OBJECT SENSING USING ARTIFICIAL INTELLIGENCE, AND METHOD FOR SETTING FUNCTION

CROSS-REFERENCE TO RELATED APPLICATION

Pursuant to 35 U.S.C. § 119(a), this application claims the benefit of earlier filing date and right of priority to Korean Application No. 10-2018-0030456, filed on Mar. 15, 2018, the disclosure of which is incorporated herein by reference in its entirety.

BACKGROUND

1. Field of the Invention

The present invention relates to a washing machine and a cloud server that set functions based on object sensing using artificial intelligence, and a control method thereof.

2. Description of Related Art

A washing machine is generally powered by an electric motor and is a device that is used to remove contaminants using the emulsifying action of detergent and the frictional action, the impact, and the like of water flow. Such a washing machine washes, rinses and dehydrate laundry.

Washing machines are divided into two types depending on a location into which laundry is inserted: a top-load washing machine and a front-load washing machine. Top-load washing machines are loaded and unloaded from the top of the washing machines while front-load washing machines are loaded and unloaded from the front of the washing machines. A top-load washing machine is rotated by a motor where the rotation shaft is arranged perpendicularly.

Washing machines wash, rinse and dehydrate laundry using water, detergent and rotational force.

If functions of washing machines are exactly set depending on the sorts and properties of laundry, their performance may improve significantly.

FIG. 1 shows re-configured technical steps of confirming fluff of laundry disclosed in US Publication No. 2010-0205823. When a drum of a washing machine rotates (S1), the image count is set to zero (S2), and information on time spent capturing an image is set to zero (S3). Then images are captured (S4). The captured images are analyzed (S5), and it is confirmed whether the obtained image count reaches a target count (S6). If the obtained image count does not reach a target count, the image count is increased by 1.

Additionally, if time that elapsed is larger than one divided by an image aspect ratio, step 4 proceeds. When the image count reaches a target count while steps S4 to S6 are repeated, it is confirmed whether laundry is covered in fluff as in step S9. If the laundry has fluff above a certain level, an operation parameter is determined (S10).

In FIG. 1, the inside of a washing machine is captured so as to confirm the state of the fluff of laundry. To this end, a high-resolution camera is needed. Further, it is difficult for a washing machine to completely identify properties of laundry because the functions of a washing machine are too limited to solve the problem of fluff.

Thus, there is a need for washing machine to identify properties of laundry and automatically set a function adequate for the properties when users place laundry into a washing machine.

SUMMARY

In this specification, disclosed are a washing machine that can produce properties of laundry and operate on the basis of the properties of laundry, and a method of controlling the same.

The present disclosure provides a device and a method for controlling the same that can supplement a washing machine if a function of the washing machine is not appropriate for laundry in the process of setting a function of the washing machine by identifying properties of the laundry and controlling operation of the washing machine.

The present disclosure provides a device and a method for calculating a wash course on the basis of physical information on laundry or information on images of laundry that is obtained so as to confirm cases where laundry applies special load to operation of a washing machine, by inputting the information to a module that performs learning on the basis of the information.

The present disclosure provides a device and a method for extracting information required for setting a course by applying various filters so as to produce properties of laundry.

The objects of the present disclosure are not be limited to what has been mentioned. Additionally, the other objectives and advantages that have not been mentioned will be understood from the following description and embodiments. Further, it will be apparent that the objectives and advantages of the invention are implemented through means in the claims and a combination thereof.

According to an embodiment, a washing machine for setting functions based on object sensing produces information on setting of a wash course adequate for laundry on the basis of the height, image, weight of the laundry, physical information or electrical information generated during a wash or receives the information from a cloud server so as to operate.

According to an embodiment, a washing machine for setting functions based on object sensing includes a learning unit that produces information on course setting adequate for specific laundry, and the learning unit extracts and learns features from information on the volume and image of laundry and information measured in the washing machine and produces information on course setting in response to the results of learning.

According to an embodiment, a washing machine for setting functions based on object sensing predicts or confirms water splash or a state in which laundry is placed eccentrically as a result of learning on the basis of information on features of the laundry and controls operation of the washing machine.

According to an embodiment, a cloud server for setting functions based on object sensing receives, from a plurality of washing machines, the height, image, and weight of laundry, physical information or electrical information generated during a wash, applies the information to a learning unit, produces information on course setting adequate for the laundry and provides the produced information to each of the washing machines.

According to an embodiment, a method for setting functions based on object sensing includes a step in which a washing machine measures information on features of laundry and transmits the information to a cloud server, a step in which the cloud server inputs the transmitted information to a learning unit and produces information on course setting, and a step in which the cloud server transmits the produced information to the washing machine again, and the washing machine controls functions.

According to embodiments, a washing machine controls operation for instructing a specific course in response to sensed images by sensing the volume, weight or image of laundry, thereby making it possible to reduce the possibility of incorrect operation of the washing machine, provide functions unchecked by the user and improve functions and reliability of the washing machine.

According to embodiments, a washing machine obtains physical information on laundry or information on images of laundry, confirms specific cases where laundry applies special load to operation of the washing machine and selects a wash course adequate for laundry in such a specific case, and this process is performed by a series of learned modules, thereby making it possible to provide an exact wash function adequate for laundry.

According to embodiments, a washing machine applies various filters to extract features of laundry and inputs pieces of information required for setting a course to a learning module, thereby making it possible to exactly select a function adequate for the laundry.

The advantages of the present disclosure are not limited to the above-described ones, and various advantages of the invention may be readily drawn from the configuration by one having ordinary skill in the art to which the present invention pertains.

BRIEF DESCRIPTION OF THE DRAWINGS

FIGS. 8 and 9 show an embodiment in which predetermined filters are applied to an image.

DETAILED DESCRIPTION OF EXEMPLARY EMBODIMENTS

Figure 1:
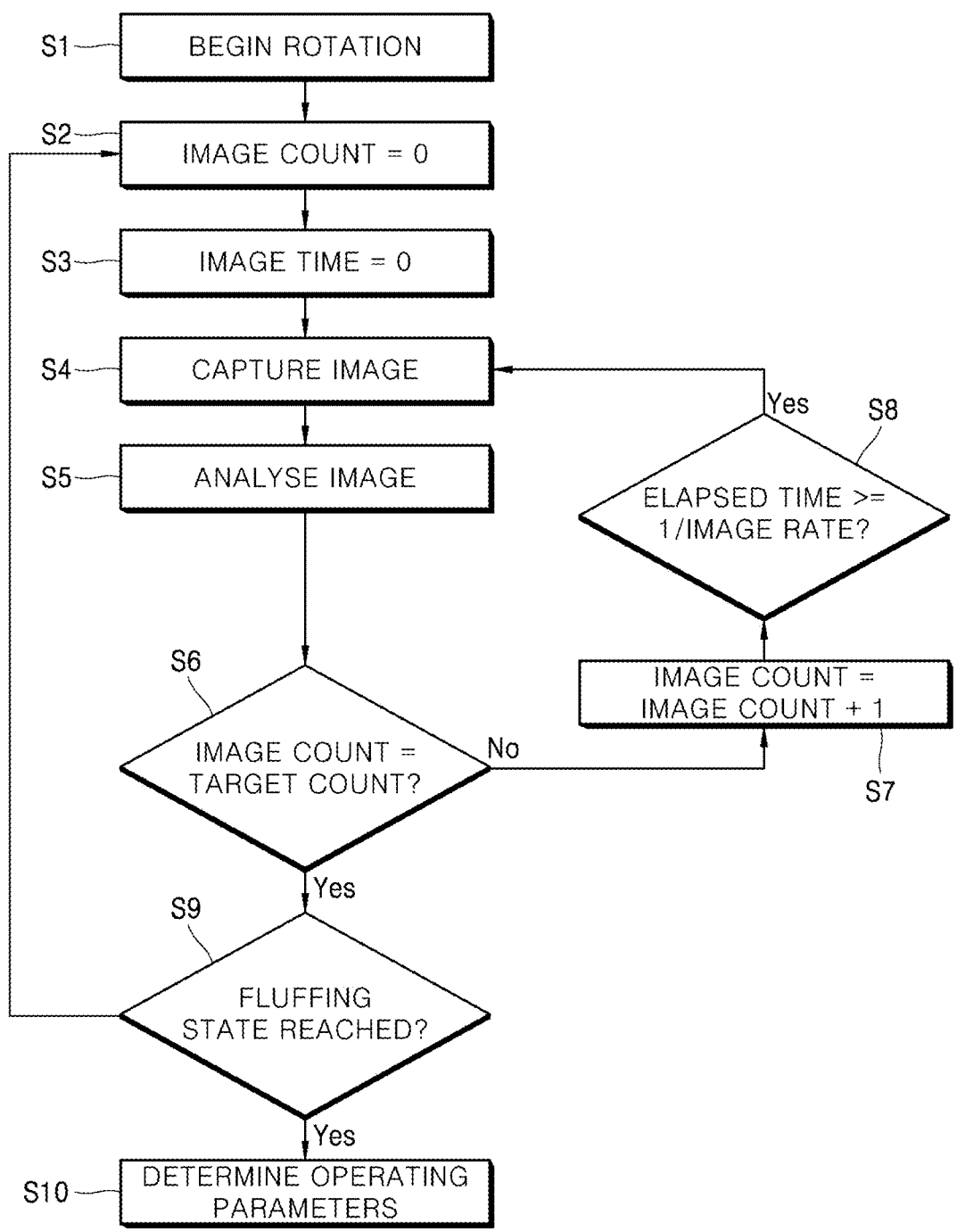
FIG. 1 shows re-configured technical steps of confirming fluff of laundry according to US Publication No. 2010-0205823.

Hereinafter, embodiments of the present disclosure will be described in detailed with reference to the accompanying drawings so that those skilled in the art can easily carry out the present disclosure.

In order to clearly describe the embodiments, the description irrelevant to the embodiments has been omitted. Same or like reference numerals designate same or like components throughout the specification. Further, some embodiments will be described in detail with reference to the illustrative drawings. Regarding the reference numerals assigned to the components in the drawings, it should be noted that the same components will be designated by the same reference numerals, wherever possible, even though they are shown in different drawings. Furthermore, in relation to describing the present disclosure, the detailed description of well-known related configurations or functions can be omitted when it is deemed that such description may cause ambiguous interpretation of the present disclosure.

Also, in relation to describing components of the present disclosure, terms such as first, second, A, B, (a), (b) or the like may be used. Each of these terms is not used to define an essence, order, sequence or the number of a relevant component but used merely to distinguish the relevant component from other component(s). It should be noted that, when it is described in the specification that one component is "connected," "coupled" or "joined" to another component, the former may be directly "connected," "coupled," and "joined" to the latter or "connected", "coupled", and "joined" to the latter via another component.

In addition, in relation to implementing the present disclosure, features of the present disclosure may be described as being performed by separate components for ease of explanation. However, these features may be implemented by a single device or module, or one feature may be implemented by several devices or modules.

In this specification, described are a method for automatically setting a wash course and a device for implementing the same on the basis of learning of images of laundry and courses set by the user are described. Additionally, in this specification, embodiments in which a camera in a washing machine is used to recognize properties of laundry, and wash control is automatically set so as to automatically solve problems that can occur during a main wash course due to a specific sort of laundry or laundry with specific properties without being interfered by the user. In this process, information on the location and height of laundry, or on the weight of laundry, and the like may also be used to identify features of the laundry.

In this specification, a top-load washing machine is described as an example. However, the present invention may also be applied to a location and a configuration in a front-load washing machine, corresponding to a location and a configuration of a top-load washing machine.

Figure 2:
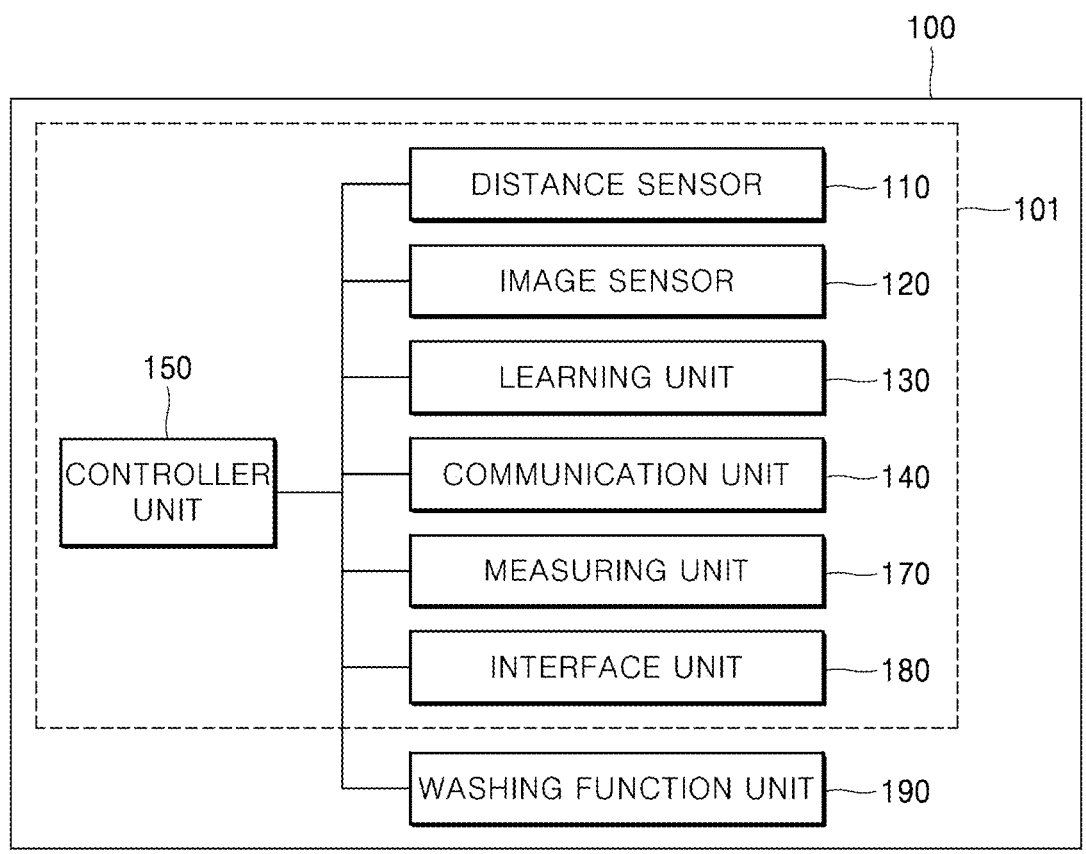
FIG. 2 shows a configuration of a washing machine according to an embodiment of the present invention.

FIG. 2 shows a configuration of a washing machine according to an embodiment of the present invention.

A washing machine 100 consists of a washing function unit 190 that stores and performs washing of laundry. For example, the washing function unit 190 may include a tub, a drum, and a motor, and the like for washing. The washing machine 100 may also include a control module 101 that sets functions to operate the washing function unit 190 or provide functions for generating and storing information, and the like. The washing function unit 190 performs physical and electrical functions for storing and washing laundry. The control module 101 is described as a single unit of logical elements for the sake of description. However, the control module 101, and other components described herein, can be implemented integrally or as separate elements. In some scenarios, the control module 101 may be implemented as one or more processors and one or more computer memory devices that performs operations of one or more components in the control module 101.

Elements in the control module 101 extract features of laundry put into the washing machine, set a wash function adequate for the features and control operation of the washing function unit 190.

A distance sensor 110 may be arranged at an upper portion or at a lateral portion of the washing function unit 190. The upper portion designates a position higher than laundry such as a cover of the tub (e.g., tub cover 191 in FIG. 5) constituting the washing function unit 190 or the upper edge of the washing function unit 190, and the like. The lateral portion is an area at a lateral side in the washing function unit 190. For example, the distance sensor 110 may be placed at an uppermost portion of the lateral surface of the tub and senses a height of laundry in the case of a front-load washing machine. The distance sensor 110 produces information on distances (e.g., information on depth). As an embodiment, the distance sensor may be arranged at the upper end of a top-load washing machine and may measure height of the laundry piled onto the tub. For example, a radio frequency (RF) signal, or an infrared signal may be used. A ToF (time of flight) sensor or a depth sensor is presented as an embodiment.

An image sensor 120 that produces information on colors (or information on grayscale contrast) may be arranged at the upper portion or the lateral surface of the washing function unit 190, like the distance sensor 110. The image sensor may be arranged at the upper end of a top-load washing machine and sense the colors of laundry piled in the tub. An RGB (Red, Green, Blue) camera may be presented as an embodiment. The image sensor may be combined with the depth sensor to produce RGB-D (RGB and Depth) information.

A measuring unit 170 measures the weight of laundry or physical information or electrical information that is generated during a wash. A control unit 150 controls the washing function unit 190 in accordance with information on distances produced by the distance sensor 110, information on images produced by the image sensor 120, information on measurements produced by the measuring unit 170, on the basis of information on course setting produced by a learning unit 130 in the washing machine 100 (or produced by a learning unit in a cloud server outside the washing machine, such as learning unit 230 in cloud sever 200 of FIG. 7).

A learning unit 130 of the washing machine (or a learning unit 230 of the cloud server 200 in FIG. 7) allows the washing machine 100 and/or the cloud server 200 to learn and extract features of laundry or produce information on course setting adequate for the features.

Figure 3:
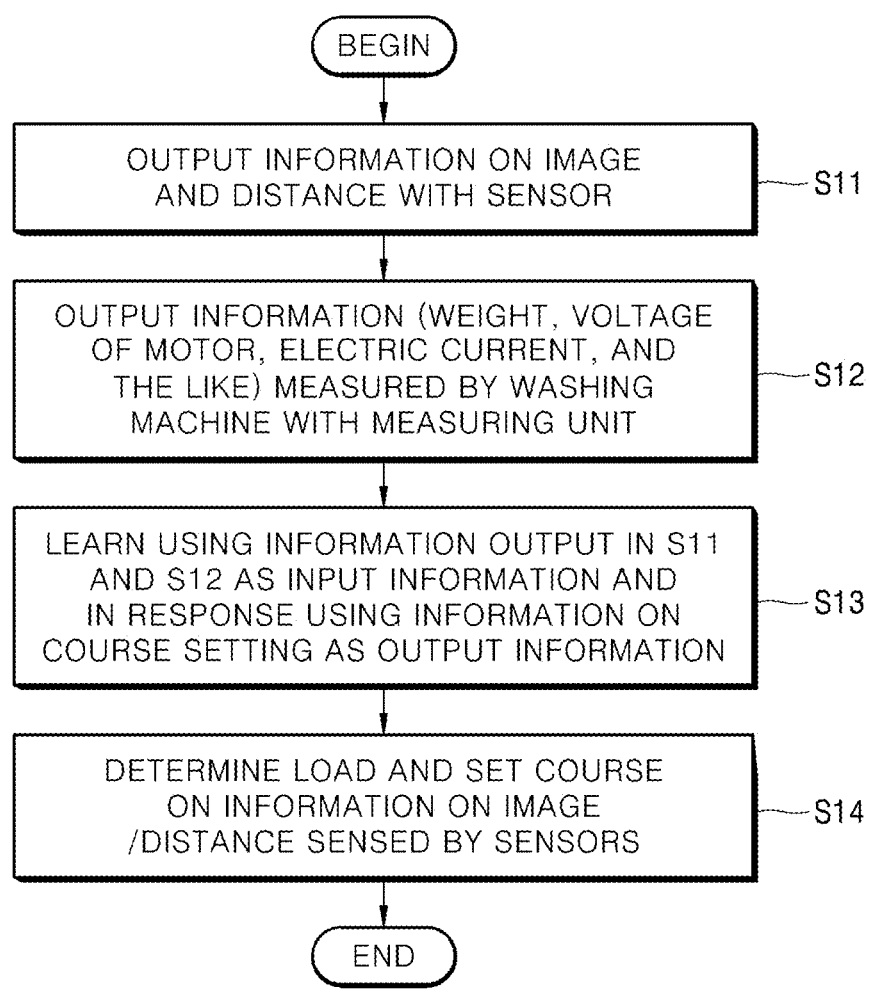
FIG. 3 shows a process of operation of a washing machine according to an embodiment of the present invention.

FIG. 3 shows a process of operation of a washing machine according to an embodiment of the present invention.

One or more sensor (e.g., the sensors 110, 120 in FIG. 2) produce information on images and distances (S11). A measuring unit (e.g., the measuring unit 170 in FIG. 2) produces information (e.g., information regarding time, an RPM, a state of being eccentric, a vibrometer, weight, voltage of a motor, an electric current, and the like) measured by the washing machine (S12).

The information produced in step 11 (S11) and step 12 (S12) is input information while information on course setting in accordance with the produced information is output information. Learning is performed on the basis of the input and output information (S13). A server connected with the washing machine 100 (e.g., through communication unit 140 in FIG. 2) may perform learning. Steps 11 to 13 represent a process of learning. A learning unit in the washing machine (e.g., learning unit 130 in FIG. 2) and/or in a cloud server outside the washing machine (e.g., learning unit 230 in FIG. 7) performs learning a number of times using information on distances, images and measurements that were produced during earlier washes as an input factor and information on course settings that were set during the earlier washes as an output factor.

According to another embodiment, the control unit 150 of the washing machine may also function as a learning unit and perform learning. As another example, a learning unit in the cloud server outside the washing machine performs learning on the basis of features and output information provided by various washing machines and after learning, provides information required for determination to the washing machine 100, in an embodiment. As a further example, the learning unit 130 performs learning on its own on the basis of features and output information provided by a corresponding washing machine 100, in another embodiment.

After learning finishes, the learning unit 130 (and/or the control unit 150, and/or the server 200 in FIG. 7) may determine whether the laundry satisfies one or more criteria that classifies the laundry as a special load. The learning unit may make this determination based on information on images and distances sensed by the sensors and may control automatic setting of courses appropriate for the special load (S14). For example, step 14 is a procedure in which the learning unit 130 or the cloud server 200 produces information on course setting adequate for input information after learning finishes. In this example, the learning unit 130 or the cloud server 200 receives information on distances, images and measurements from the control unit 150 and then, if laundry is a special load, produces information on course setting adequate for the special load.

A load (laundry) that poses problems (e.g., water splash/unbalanced power off/twisted or knotted laundry) to improvement in basic functions of a washing machine is referred to as a special load. A load that causes water splash, unbalanced power off, twisting and knotting of laundry, and the like may include padded clothing, duvets, blankets, pillows, sports clothing, dress shirts, and the like. Accordingly, when the process of FIG. 3 is applied, the washing machine 100 may recognize the volume, shape and load of laundry included in specific laundry such as padded clothing/duvets/blankets/pillows.

Specifically, the washing machine may confirm whether laundry is a special load on the basis of information on the current state (measured information) of the washing machine and information on image/depth received from the sensors (ToF/RGB-D camera sensors), predict problems of water splash, unbalanced power off and twisting and knotting of laundry and automatically set a course or a wash function so as to solve the problems.

Simply put, in the process of FIG. 3, the washing machine 100 or the cloud server 200 uses information in images and distances that is produced by the sensors (ToF/RGB-D sensors) and information on measurements (weight, voltage of a motor, an electric current, and the like) that is measured by a measuring unit (e.g., the measuring unit 170 in FIG. 2) as input factors, learns information on user setting of a course according to the input factors as an output factor. And, the washing machine automatically sets a course adequate for a load, the feature (ToF/RGB-D) of which is similar to that of a special load.

The washing machine may perform learning by using a machine-learning network, which may include various layers of nodes that are interconnected by edges. For example, the washing machine may perform learning by repeating only steps S11 to S13 and, if weight, bias, and the like of nodes and edges of a hidden layer of the machine-learning network are determined during a deep learning process, the washing machine may produce information on course setting adequate for the weight and bias as the washing machine starts a wash, as in step S14.

In steps S11 and S12, the washing machine 100 may recognize a load through learning of distance and image information of one or more sensors (e.g., the distance sensor 110 and the image sensor 120 (e.g., ToF/RGB-D sensor) in FIG. 2), apply a convolution filter to a raw image so as to produce image information and use the image information as an input feature for learning of information.

In step S13, the washing machine 100 may estimate volume of laundry using information on distances of the laundry in the tub and determine features of a load in association with information on images. The washing machine 100 recognizes the load that greatly affects the washing machine as a special load on the basis of features of a load. A duvet, padded clothing, a stuffed doll, and the like are recognized as a special load. Additionally, the washing machine sets a wash mode and a corresponding control parameter depending on a special load so as to set a course, e.g., in step 14.

Exemplary settable courses are i) automatic setting of a wash mode (e.g., an amount of water to be supplied, a wash course), ii) controlling water splash (e.g., automatic setting of water flow intensity by means of control of pump intensity), iii) controlling unbalanced power off (e.g., control of an RPM of a motor, setting of vibration threshold during dehydration, and the like), and the like.

In an embodiment, controlling water splash means preventing water splash, caused due to a load such as a duvet or padded clothing that has small weight and large volume, by means of control of hydraulic pressure while water is supplied. While water is being supplied to the tub, a large amount of laundry or laundry consisting of a material floating in the water reaches the upper portion of the tub. In this case, water that splashes over the tub causes a water leak or failure in the operation of a product. Thus, water splash has to be controlled.

Controlling unbalanced power off means controlling the state where a motor re-operates after the short circuit of three sockets of the motor occurs due to a continuous state where laundry is eccentrically placed in the tub during a wash. That is, controlling unbalanced power off means preventing laundry from being eccentrically placed in the tub. If laundry is dehydrated in the state where laundry in the tub is eccentrically placed, vibration is generated in the direction of the eccentric center of gravity, and if vibration reaches a limited level, a motor stops. This is referred to as unbalanced power off. In the case of unbalanced power off, the washing machine stops the motor and evenly distributes laundry in the tub.

Controlling unbalanced power off also includes control of the rotational direction of the tub to prevent laundry from tangling.

As in FIG. 3, the washing machine 100 may confirm a special load in laundry on the basis of information on images and distances of the laundry in the tub and accordingly, may automatically set a course required for the special load. As a result, the washing machine may provide users with convenience in setting of a course, prevent noise, vibration, water splash, and the like caused by a special load in laundry, reduce wash time and exactly predict end time of washing, thereby making it possible to provide the user with enhanced convenience.

As described above, if a washing machine does not automatically set a wash course adequate for a special load, the laundry or the washing machine may be damaged. For instance, if properties of laundry are not taken into account, a course may be set in combination of menus that have been set frequently in accumulated information on courses that were set before, regardless of sorts of laundry.

Such courses may not be appropriate for laundry or functional clothing that is not frequently washed by a washing machine. If the embodiment of FIG. 3 is applied, after learning information on images of laundry and information on user setting of a course, the washing machine may automatically set various courses that may be provided by the washing machine when the washing machine determines laundry is similar to the laundry that was washed by the washing machine before so as to improve performance of the washing machine.

Figure 4:
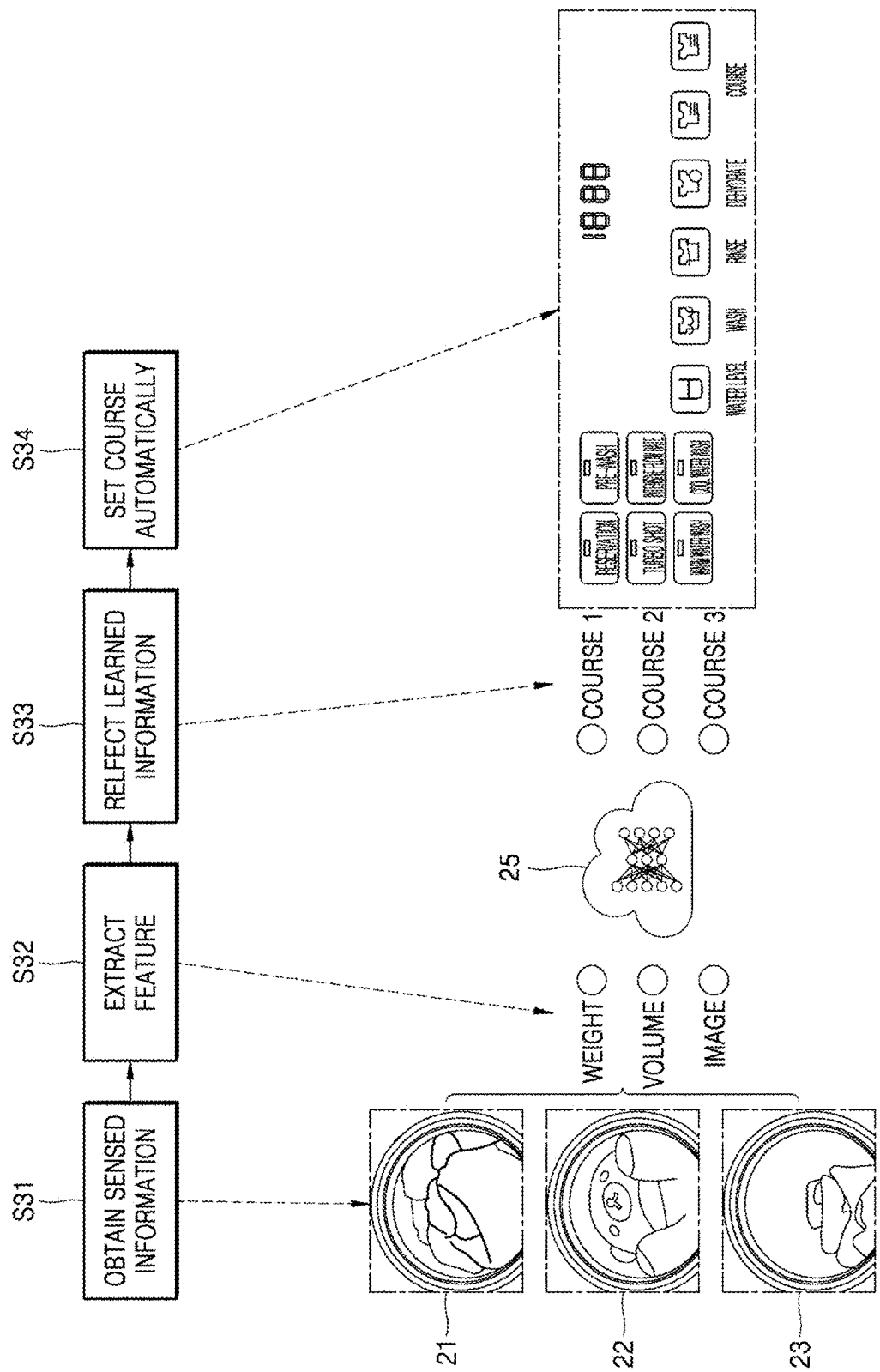
FIG. 4 shows a process of an automatic setting on the basis of a load and a wash course set by the user according to an embodiment of the present invention.

FIG. 4 shows a process of an automatic setting on the basis of a load and a wash course set by the user according to an embodiment of the present invention. FIG. 4 shows a process in which a learning unit (e.g., the learning unit 130 of the washing machine 100 in FIG. 2 and/or the learning unit 230 of the cloud server 200 in FIG. 7) learns information on images, volume, weight, and the like of laundry. And, the washing machine 100 sets a wash course automatically which is appropriate for the laundry based on the learned result.

The steps and interaction between elements in FIG. 3 will be described hereafter. Laundry including a special load may be arranged in the tub of a washing function unit (e.g., washing function unit 190 in FIG. 2) as in states 21, 22 or 23. In this example, a duvet is arranged in state 21, a stuffed doll is arranged in state 22, and knitted clothing is arranged in state 23.

One or more sensors (e.g., distance sensor 110 and image sensor 120 in FIG. 2) sense the laundry in the tub as in states 21, 22 and 23 and obtain information on images, distances, and the like (S31). The obtained information may be a feature and as an embodiment, may be matched with the image and volume of the laundry. Information on distances may be used to confirm the volume of the laundry.

A measuring unit (e.g., measuring unit 170 in FIG. 2) senses a weight of the laundry and generates one or more features. In this example, information on three features (e.g., weight, volume, image) is provided as an input factor to a learning module 25 (e.g., in the washing machine 100 and/or in a cloud server that communicates with the washing machine 100) for learning. The learning module 25 may include the learning unit 130 in the washing machine 100 (in FIG. 2) and/or the learning unit 230 in the cloud server 200 (in FIG. 7). As such, in some examples, the learning module 25 includes the learning unit 130 of the washing machine 100 and the learning unit 230 of the cloud server 200. The learning module 25 may have an input factor and an output factor, and set weight and bias of nodes and links, and the like between the input factor and the output factor.

In states 21, 22 or 23, information courses (e.g., course 1, course 2, course 3, and the like) selected by the user may be provided as an output factor.

The learning module 25 (e.g., the learning unit 130 of the washing machine 100 and/or the learning machine 230 of the cloud server 200) performs learning on the basis of the input factor (e.g., weight, volume, image) and information on courses (e.g., course 1, course 2, course 3) selected by the user and produces weight and bias of each node and each link (edge) that set interaction between the input factor and the output factor. Courses 1, 2 and 3 may be information on setting of a separate course such as a course for duvets, a course for a stuffed doll, a course for padded clothing, and the like that correspond to a special load, as an embodiment. Further, courses 1, 2 and 3 may include information on a detailed course adequate for each special load (e.g., amount of water, rotation speed, intensity of dehydration, solution to twisted laundry, and the like).

When the learning module 25 finishes learning, the washing machine 100 may reflect information on learning (S33) and automatically set a course according to a state where laundry is arranged in the tub (S34).

To sum up, information on features produced by sensors (e.g., the sensors 110, 120 in FIG. 2) and information on features produced by a measuring unit (e.g., the measuring unit 170 in FIG. 2) are provided to the learning module 25, and the learning module 25 performs learning using information on courses set by the user as output information, in FIG. 4.

When laundry is put into the tub after the learning module finishes learning, the sensors (e.g., sensors 110, 120 in FIG. 2) and the measuring unit (e.g., measuring unit 170 in FIG. 2) produce information on features of the laundry. When the information on features is input to the learning module 25, a course adequate for the information on features may be automatically drawn. A control unit (e.g., control unit 150 in FIG. 2) may control operation of a washing function unit (e.g., the washing function unit 190 in FIG. 2) using the drawn course.

If the server performs learning, a course manual adequate for laundry may be provided to the server in the process of learning. Additionally, a control unit (e.g., the control unit 150 in FIG. 2) may monitor delay in the operation of the washing machine on a corresponding course and include the delay in the process of learning. For instance, the control unit may confirm time delay that occurs when the user continues to use the washing machine in the state where the user sets a course incorrectly, or unbalanced power off, twisted or knotted laundry, water splash, and the like that occur while the washing machine operates. Then, if a course is not selected incorrectly, the control unit may reflect errors in the course set by the user in learning.

Step 34 in FIG. 4 may include outputting information on exceptional cases in addition to automatically setting a course. For instance, step 34 may include predicting water splash, unbalanced power off or twisted or knotted laundry as a result of inputting extracted features into the learning module 25.

Figure 5:
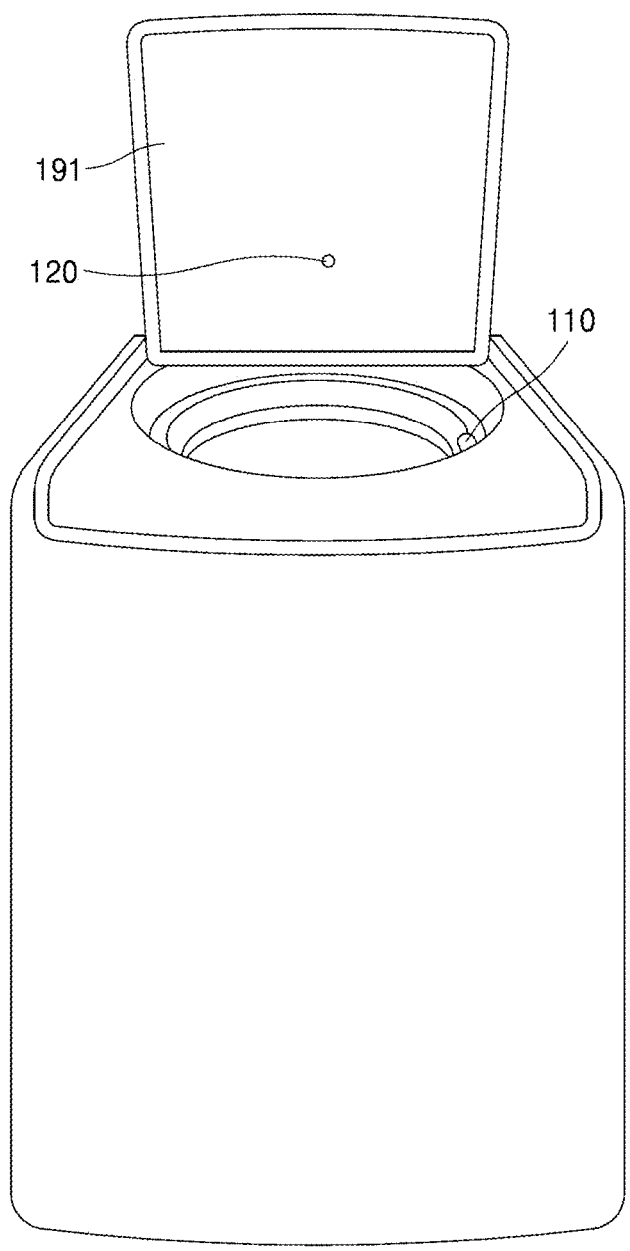
FIG. 5 shows a configuration in which sensors are arranged in a top-load washing machine according to an embodiment of the present invention.

FIG. 5 shows a configuration in which sensors are arranged in a top-load washing machine according to an embodiment of the present invention. As an embodiment, an image sensor 120 may be arranged on a tub cover 191 so as to capture an image of laundry in the tub. Additionally, a distance sensor 110 may be arranged on a lateral surface of the tub so as to sense height of laundry in the tub.

Certainly, the distance sensor 110 and the image sensor 120 may all be arranged on the tub cover 191, or the distance sensor 110 and the image sensor 120 may all be arranged on a lateral surface of the tub.

In an exemplary configuration, a distance sensor 110 may be arranged on a tub cover 191 so as to sense height of laundry in the tub, and an image sensor 120 may be arranged on a lateral surface of the tub so as to capture an image of laundry in the tub.

Figure 6:
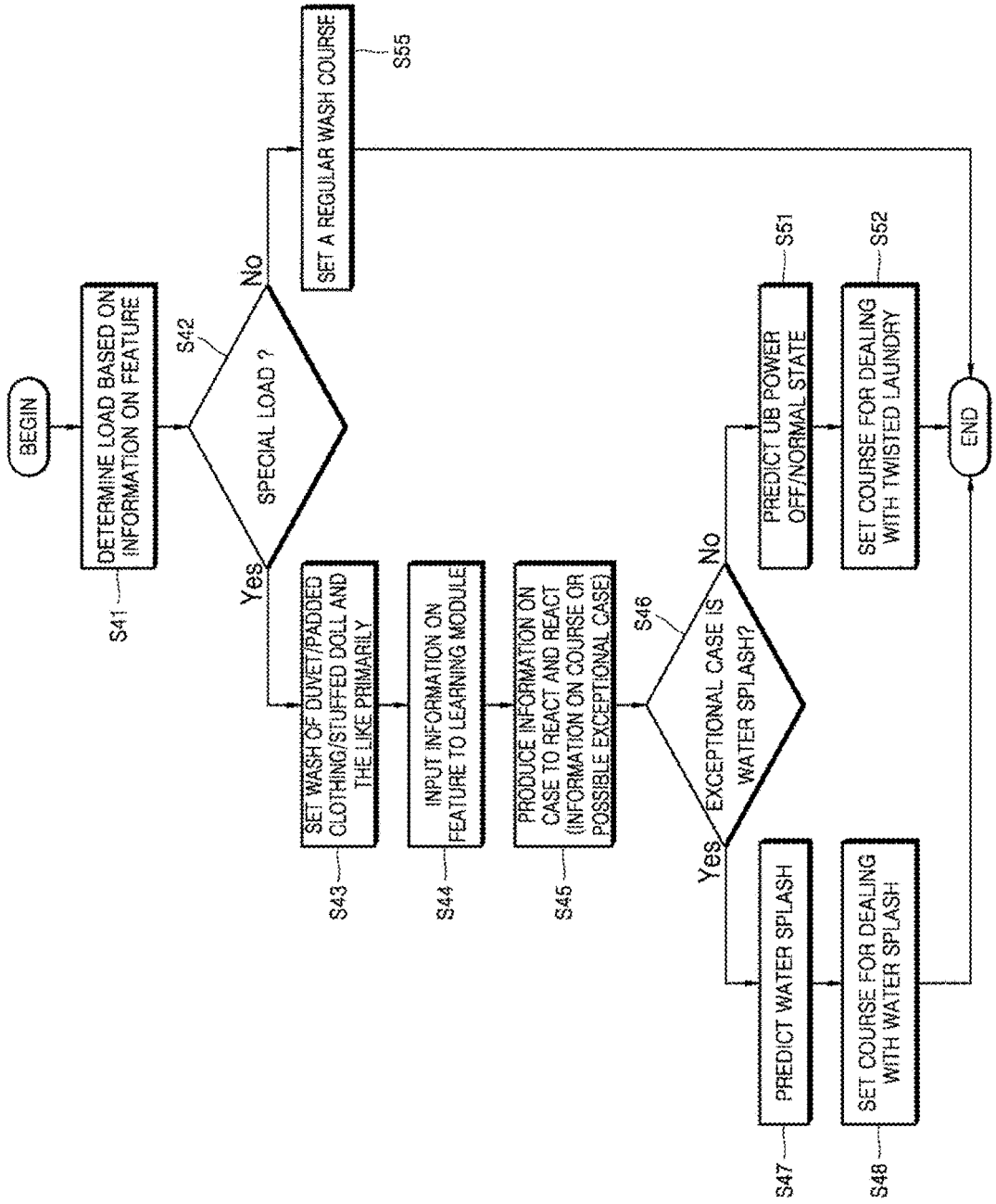
FIG. 6 shows a detailed process of operation according to an embodiment of the present invention.

FIG. 6 shows a specific process of operation according to an embodiment of the present invention.

One or more sensors (e.g., distance sensor 110 and image sensor 120 in FIG. 2) arranged at a fixed height obtains depth data (e.g., information on distances) and an image, and determines whether laundry is a special load or a usual load on the basis of information on a depth image including information on distances, and information on an RGB image or a gray scale image generated by the image sensor 120. A special load means a specific type of laundry requiring a specific wash while a usual load means a load not requiring a specific wash.

For instance, an input factor, or a depth image (1-channel) and a grayscale image (1 channel) or an RGB image (3 channel) as an input matrix is input to a learning module (e.g., the learning module 25 in FIG. 4), and finally, the learning module 25 determines whether laundry is a duvet, a stuffed doll, padded clothing, a usual load on the basis of a weight matrix, a bias vector, a filter matrix, and the like learned by the learning module 25 before (S41).

The learning module 25 makes such a determination (S41) to confirm specific laundry (load) such as a duvet, a stuffed doll, padded clothing that have small weight and large volume or has low density compared to a usual load. The learning module may determine whether laundry is a special load that affects main wash courses (wash administration) such as water supply, dehydration, and the like, produce information on wash courses adequate for the laundry and prevent problems such as delay in wash time, water splash, vibration or increased noise.

That is, the learning module 25 may use information on images, distances, volume, and the like of laundry for learning features of a load. And, the learning module 25 may determine whether the laundry badly affects the washing machine while the laundry is washed and produce information on course setting for a wash mode and control appropriate for the laundry.

Additionally, after recognizing a load, the learning module sets a course adequate for the load as in steps S43 to S52 if the load is specific one (S42) and sets a regular wash course if the load is usual one (S55).

More specifically, the learning module confirms whether a load is specific one or usual one adequate for a regular wash on the basis of information on features in step S41 (S42). After recognizing the load, the learning module sets a wash for a duvet/a stuffed doll/padded clothing (S43) and automatically sets an amount of water to be supplied, an RPM, duration of dehydration, and the like adequate for the load (S43, S55).

Information on features (e.g., a depth image as information on distances, an RGB image or a grayscale image converted from an RGB image, information on wash administration or measurements), and the like is converted into information in the form of a matrix (input matrix) and provided to the learning module 25.

Input matrix may include a depth image (1 channel) as information on distances and a grayscale image (1 channel) or an RGB image (3 channel) for distinguishing laundry. Additionally, data in the washing machine (e.g., 1-channel such as information on measurements or administration, and the like) may be an input matrix. The input matrix is inputted to the learning module 25 (S44). The learning module finally produces information on water splash, unbalanced power off, normal operation, a reaction through a weight matrix, a bias vector, a filter matrix, and the like set by nodes and links in the learning module 25 (S45).

Drawing information on a reaction may be a course adequate for the current laundry or may be information on possible exceptional cases. As an embodiment, a course set in response to each of the water splash, unbalanced power off or normal operation may be included in the former case (information on course setting), and information on water splash, unbalanced power off or normal reaction may be included in the latter case.

In the latter case, when there is water splash as an exceptional case (S46), the control unit 150 predicts or determines that there would be water splash (S47) and sets a course to prevent the problem of water splash (S48). For instance, in the example of FIG. 2, the control unit 150 may give an instruction to stop to a washing function unit 190, rotates at an RPM adequate for the shape and volume of laundry, control hydraulic pressure and set a course to deal with water splash.

The learning module 25 in FIG. 4 (e.g., the learning unit 130 of the washing machine 100 in FIG. 2, and/or the learning unit 230 of the cloud server 200 in FIG. 7) determines water splash on the basis of information on distances, images and measurements. In the case, the learning module 25 determines laundry have small weight and large volume. That is, if a large volume and amount of laundry that has small weight is piled, or if an excessive volume and amount of laundry is piled, the learning module 25 determines water splash is highly likely to occur when water is supplied for a wash.

For instance, when a distance between the tub cover 191 (in FIG. 5) and laundry (e.g., depth information) is shorter, or the volume of laundry is larger, the learning module may determine that water splash is more likely to occur. In the case of a special load that is highly likely to cause water splash, the learning module 25 may produce information on course setting for preventing water splash as information on course setting. The produced information on course setting includes setting of a course for reducing the speed at which water is supplied or the amount water to be supplied.

As another embodiment, the control unit 150 may stop a pump of the washing function unit 190, rotate at an RPM adequate for the volume of laundry and control hydraulic pressure so as to deal with the problem of water splash. Additionally, the control unit may continue to accumulate information on images, distances or measurements of laundry and confirm whether new information on course setting is required through the learning module 25. Further, the control unit 150 of the washing machine 100 may re-operate the pump of the washing function unit 190 or control hydraulic pressure.

In the case of unbalanced power off, the learning module 25 may confirm that laundry is highly likely to be eccentrically placed when a certain amount and a certain volume of laundry is eccentrically placed. For instance, the control unit 150 may stop dehydration and supply an adequate amount of water to the laundry so as to evenly distribute the laundry as information on course setting. Additionally, the control unit rotates at an RPM adequate for the volume of the laundry even after water supply or water drainage and re-sets vibration threshold adequate for the laundry to prevent excessive vibration.

Besides, if the user sets an incorrect course even though the control unit 150 determines that laundry is a special load, the control unit controls an interface unit 180 and informs the user that the course is set incorrectly.

When the learning module 25 in FIG. 4 (e.g., the learning unit 130 of the washing machine 100, and/or the learning unit 230 of the cloud server 200) determines that laundry is eccentrically placed in the washing function unit 190 on the basis of information on distances, images measurements, the learning module predicts that unbalanced power off is highly likely to occur.

For instance, if height of laundry captured from the tub cover 191 (in FIG. 5) is not constant or if laundry captured from the tub cover 191 is eccentrically placed, when weight is eccentrically sensed as a result of sensing the weight of the laundry, the learning module 25 may produce information on course setting for evenly distributing the laundry in the washing function unit as information on course setting. Additionally, the learning module 25 may also stop a wash or dehydration and supply water to evenly distribute laundry twisted or eccentrically placed. Further, the learning module may set a course for reducing the speed at which water is supplied or for reducing the amount of water, and the like. Accordingly, the control unit 150 predicts unbalanced power off or a state of not being eccentric (normal state) (S51) and sets a course for evenly distributing laundry twisted or eccentrically placed (S52).

For instance, the control unit 150 allows the washing function unit 190 to stop dehydration, to supply an adequate amount of water so as to evenly distribute the laundry depending on the shape and volume of the laundry and after water supply, and to operate at an RPM adequate for a load.

To this end, the control unit may determine an adequate amount of laundry or set a course through the learning module 25 at the time of putting laundry into the washing machine. Additionally, the control unit may continue to extract information on features during a wash, determine an adequate amount of laundry through the learning module 25 and change a course adequate for the laundry or select an additional function.

Figure 7:
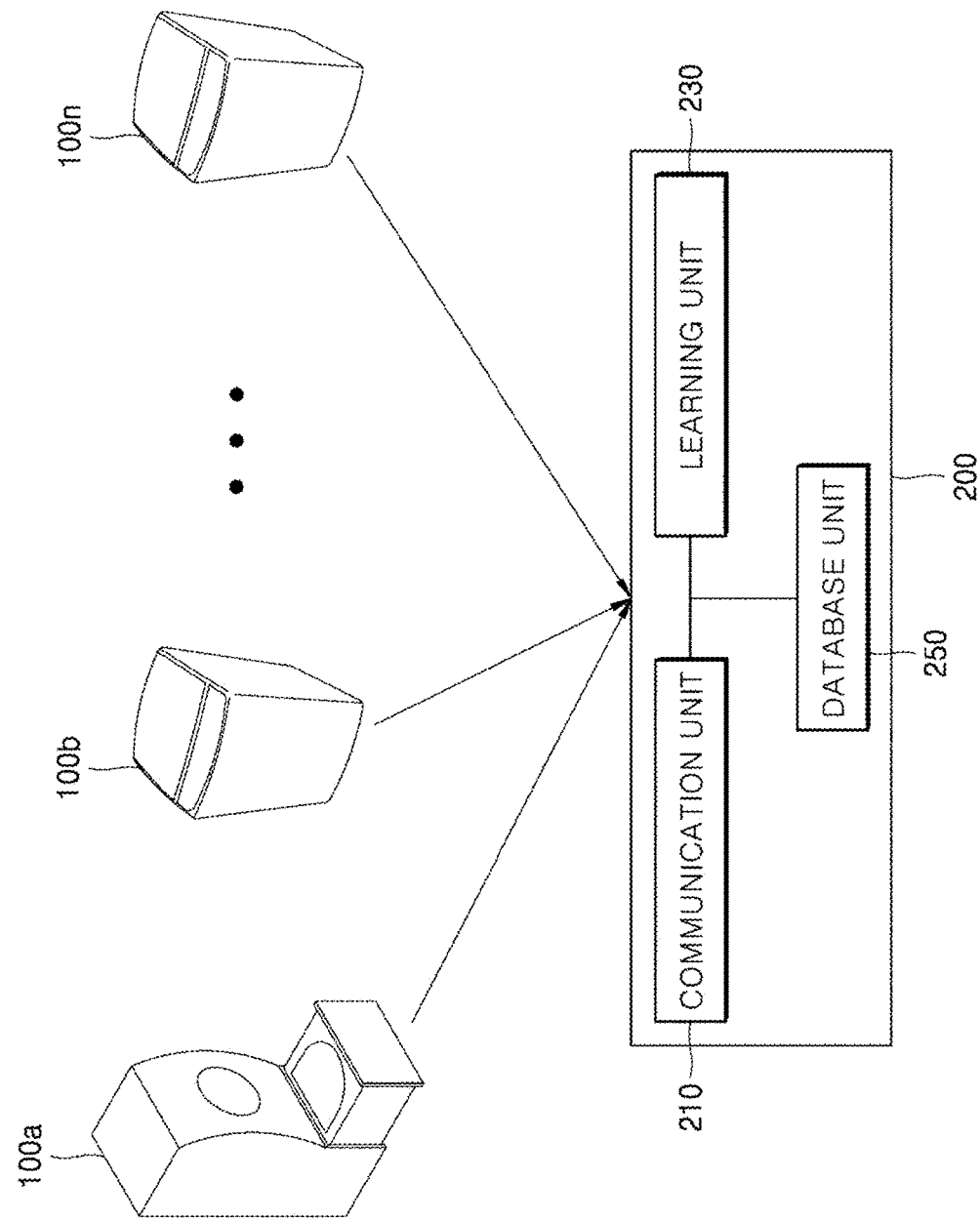
FIG. 7 shows a configuration in which a cloud server performs learning according to an embodiment of the present invention.

FIG. 7 shows a configuration in which a cloud server performs learning according to an embodiment of the present invention. Although a single cloud server 200 is shown, the cloud server 200 may be implemented as multiple servers in some scenarios.

While the cloud server 200 communicates with a plurality of washing machines (e.g., washing machines 100a, 100b, . . . , 100n), a learning unit 230 performs learning on the basis of information on features (e.g., information on images, distances, volume, weight, and the like) provided by the plurality of washing machines and information on wash courses (e.g., a wash course, a dehydration course, and the like) selected by the user. Then the learning unit 230 of the cloud server 200 may predict information on course setting or an exceptional case, and the like in accordance with information on features provided by the washing machines and my provide information on setting of an adequate course.

A database unit 250 stores the information on features provided by the washing machines. As an embodiment, the database unit 250 stores information on the volume or the weight of laundry, images of laundry (e.g., information on distances as a depth image, images for identifying sorts of laundry as an RGB image or a gray scale image, and the like) produced by the sensors, and information on measurements (e.g., information on a motor, and the like) produced by the measuring unit 170 of each washing machine.

The cloud server 200 stores information on features as a parameter on the database unit 250. The learning unit 230 calculates a normal distribution of wash time for the same load. If wash time is outside the calculated normal distribution, the cloud server 200 informs the washing machine about the abnormal state of the wash machine. For instance, if wash time is outside a normal distribution which indicates time spent washing a constant amount and volume of laundry, the learning unit 230 may determine the washing machine has a problem and the cloud server 200 may inform the washing machine of the problem through a communication unit 210 or through a mobile device. Additionally, the database unit 250 stores information on a currently set course, setting of a course input by the user, or information on course setting drawn as a result of learning of the learning unit 230.

Additionally, the database unit 250 accumulates information on vibration, wash time for a similar load on the same course, and if there is any abnormality in the information in comparison with statistics of a database collected in the cloud server 200, informs the user of the abnormality. For instance, if there is any abnormality, the communication unit 210 of the cloud server 200 may transmit a message of the abnormality to a washing machine.

Like the learning unit 130 of the washing machine 100, the server 200 or the learning unit 230 of the sever 200 in FIG. 7 may be an embodiment of the learning module 25 that was illustrated in FIG. 4.

Additionally, if the user wants to know about a wash course with user information on a wash course for a similar load collected in the cloud server 200, the cloud server may provide information on a wash course, determined through learning and frequently applied for such a load. The cloud server may compare wash time for the same load on the same course and if there is any delay in wash time, may provide a guide as to customer services and examinations.

In the configuration of FIG. 7, communication units (e.g., communication unit 140 in FIG. 2) of the washing machines 100a, 100b, . . . , 100n transmit, to the cloud server 200, information on distances, images and measurements produced during a wash, and the communication unit 210 of the cloud server 200 receives the information. Also, information on course setting optionally set to the washing machine, a washing machine model, or identification, and the like may be transmitted to the cloud server 200.

The learning unit 230 of the cloud server 200 determines whether laundry is a special load on the basis of information on distances, images and measurements and if the laundry is a special load, produces information on course setting. The communication units (e.g., communication unit 140 in FIG. 2) of the washing machines 100a, 100b, . . . , 100n receives the information on course setting produced by the communication unit 210 of the cloud server 200.

Then, control units (e.g., control unit 150 in FIG. 2) of the washing machines 100a, 100b, . . . , 100n may control a washing function unit (e.g., the washing function unit 190 in FIG. 2) on the basis of the received information on course setting.

Figure 9:
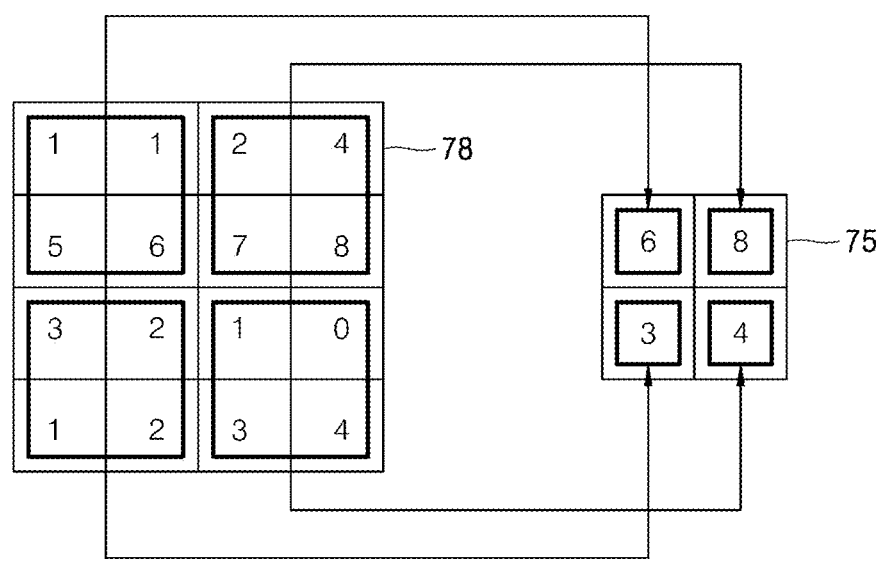

FIGS. 8 and 9 show an embodiment in which a predetermined filter is applied to an image. FIG. 8 shows a process of applying convolution according to an embodiment of the present disclosure. As an embodiment, learning process based on convolution is an operation in which features are extracted while a specific filter (e.g., a 3×3 filter) moves in an image. In FIG. 8, value of each pixel of an image 60 is set to 1 or 0. When a 3×3 kernel filter 65 is applied to the image, convolution is performed, in step S67, a value of 4 is produced (in 66a) as a result of applying a filter 65 to a first 3×3 matrix 60a in the image 60.

When the filter 65 is shifted to the right and applied to a second 3×3 matrix 60b in the image 60 in step 68, a value of 3 is produced (in 66b).

FIG. 9 shows max pooling in which a single filter is applied to an image, and the largest value in a corresponding cell is set according to another embodiment of the present invention. A 2×2 filter is applied to an image 78, and the largest value in four pixels is stored together with 75.

Figure 10:
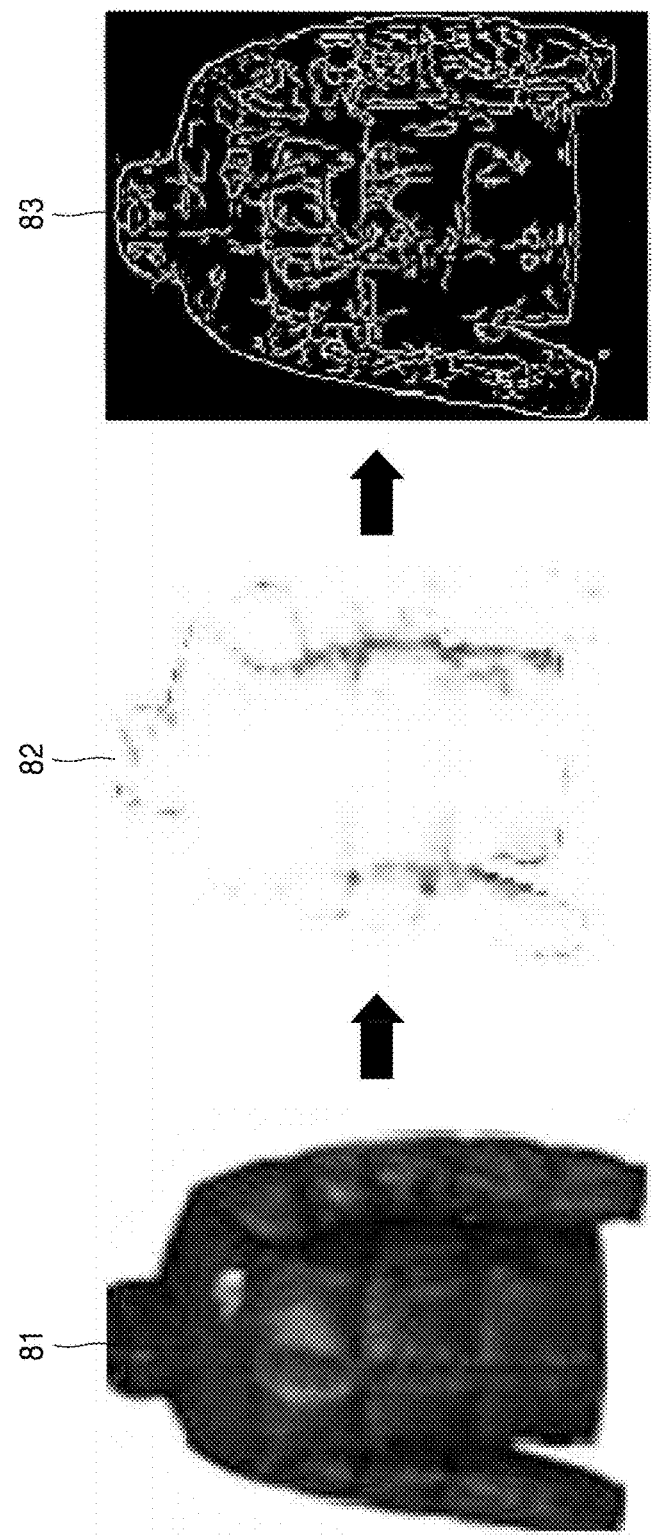
FIG. 10 shows a process of producing features of an image of padded clothing with a convolution filter according to an embodiment of the present invention.

FIG. 10 illustrates an embodiment in which features are extracted from the produced image. In FIG. 10, when a filter is applied to an image of laundry, features of the image may be extracted. In particular, when a variety of filters are applied to an image of laundry, there are various types of converted images. When the converted images are input to the learning module, an image filter adequate for setting of a course may be determined.

A process of confirming padded clothing will be described with reference to FIG. 10. A specific filter may be applied to an image of padded clothing 81. When various sub-images of the image of padded clothing are included in each filter (e.g., a filter consisting of sub-images such as a specific color, a specific pattern, and the like), and the filter is applied to the image of padded clothing, parts corresponding to the sub-images are only extracted, and then features may be extracted like image 82.

When a convolution filter or a max pooling filter is applied to the produced image 82, an image 83 may be produced. As an embodiment, sub-images may be applied to an image of padded clothing. The sub-images include a pattern of oblique lines, a pattern of mixed colors, and the like. Filters may vary according to sorts of laundry to be filtered.

If necessary, filters may be classified into a filter for a duvet, a filter for padded clothing, a filter for a stuffed doll, and the like. Various filters may be used to generate an image for an input matrix, and learning may be performed on the basis of a filter that exactly extracts features of laundry.

In the example of FIG. 10, a process is shown of producing features of an image of padded clothing on the basis of a convolution filter according to an embodiment of the present invention. Information on an image produced by the image sensor 120 is designated as image 81. When a first convolution filter is applied to an original image 81 (e.g., as in FIG. 8) so as to highlight specific factors in the image of padded clothing, the original image is converted into an image 82 where the appearance and major parts of the padded clothing are highlighted.

Additionally, a second convolution filter may be used to exactly produce features of the image in grayscale like image 83. In FIG. 10, features may be extracted from an image on the basis of a convolution filter including sub-images.

In FIG. 10, a prepared filter is applied to a specific sort of laundry, features of the laundry may be extracted, and the sort of laundry may be confirmed on the basis of the extracted features. Information on volume of laundry may be produced on the basis of information on height, weight, and the like of the laundry piled, and the sort of laundry may be confirmed on the basis of the information on volume.

To sum up, information on images produced to confirm features of laundry may be an RGB image or a grayscale image or information of an image where one or more of any one of a convolution filter or a max pooling filter is applied to an image sensed by the image sensor 120, and features are extracted. An image with extracted features may be used to exactly determine whether laundry is a special load (e.g., padded clothing, a duvet, a stuffed doll, and the like).

Figure 11:
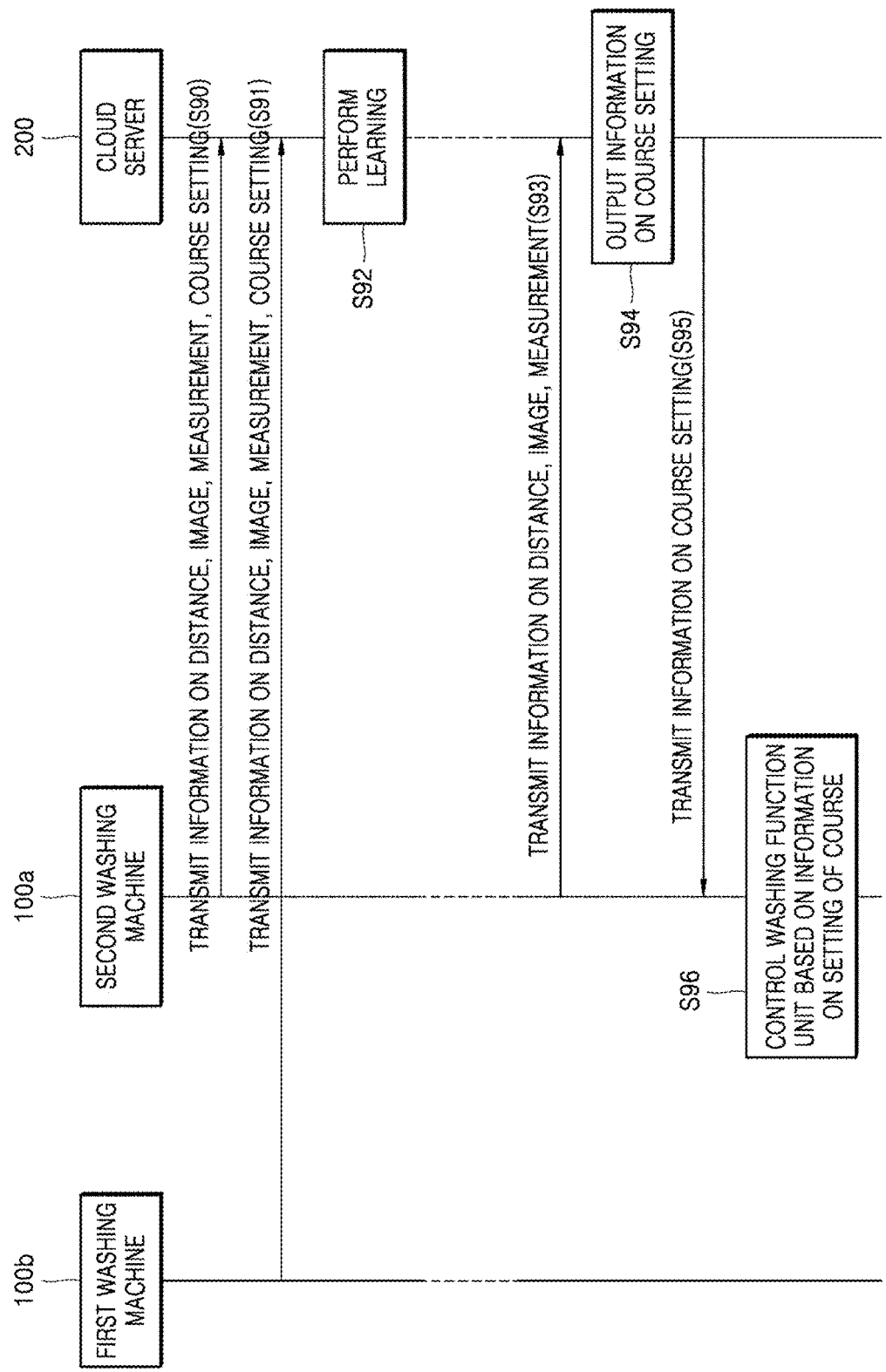
FIG. 11 shows a process of exchanging information between a cloud server and a washing machine according to an embodiment of the present invention.

FIG. 11 is a view illustrating a process of exchanging information between a cloud server and a washing machine according to an embodiment of the present invention.

The cloud server 200 may perform learning from step 90 (S90) to step 92 (S92) so as to operate in accordance with a special load. A plurality of washing machines 100a, 100b transmits, to the cloud server 200, information on distances produced by a distance sensor (e.g., the distance sensor 110 in FIG. 2) of the washing machine, information on images produced by an image sensor (e.g., the image sensor 120 in FIG. 2) of the washing machine, information on measurements produced by a measuring unit (e.g., the measuring unit 170 in FIG. 2) of the washing machine and information on course setting that is set to the washing machine according to these pieces of information (S90, S91).

After information of a learning unit (e.g., the learning unit 230 in FIG. 7) of the cloud server 200 is updated through learning performed by the learning unit a certain number of times, the cloud server 200 receives information on distances, images, measurements from a washing machine 100a (S93). The cloud server 200 inputs the received information to the learning unit 230, and the learning unit 230 produces information on course setting in accordance with the information (S94). A communication unit (e.g., the communication unit 210 in FIG. 7) of the cloud server 200 transmits the produced information on course setting to the washing machine 100a (S95), and the washing machine 100a controls a washing function unit (e.g., the washing function unit 190 in FIG. 2) on the basis of the information on course setting (S96).

In some scenarios, steps S90 to S92 may be performed and finished in advance. For example, some of the washing machines may participate in learning (steps 90 to 92). The other washing machines may receive information on course setting adequate for laundry on the basis of steps S93 to S96 without learning process (steps 90 to 92), and the received informations are produced by learning unit 230 of the cloud server 200. Additionally, the washing machines may set a course on the basis of steps S93 to S96 at the time of starting a wash and, if there is any abnormality (water splash, unbalanced power off, and the like) during the wash, receive information on course setting different from the current course on the basis of steps S93 to S96 and operate.

The steps of the example in FIG. 11 are summed up as follows (referring to components of washing machine 100 in FIG. 2 and components of server 200 in FIG. 7).

A communication unit 140 of the washing machine 100a transmits, to the cloud server, information on distances produced by the distance sensor 110 of the washing machine 100a, information on images produced by the image sensor 120 of the washing machine 100a, information on measurements produced by the measuring unit 170 of the washing machine 100a (S93).

The learning unit 230 of the cloud server 200 that has already finished learning in steps S90 to S92 inputs the information on distances, images and measurements into an input node and produces information on course setting (S94). A communication unit of the cloud server 200 transmits the produced information on course setting to the communication unit of the washing machine (S95). Next, a control unit of the washing machine controls operation of the washing function unit on the basis of the information on course setting received from the cloud server 200 (S96). As a result, functions of the washing machine may be set based on object sensing.

Figure 12:
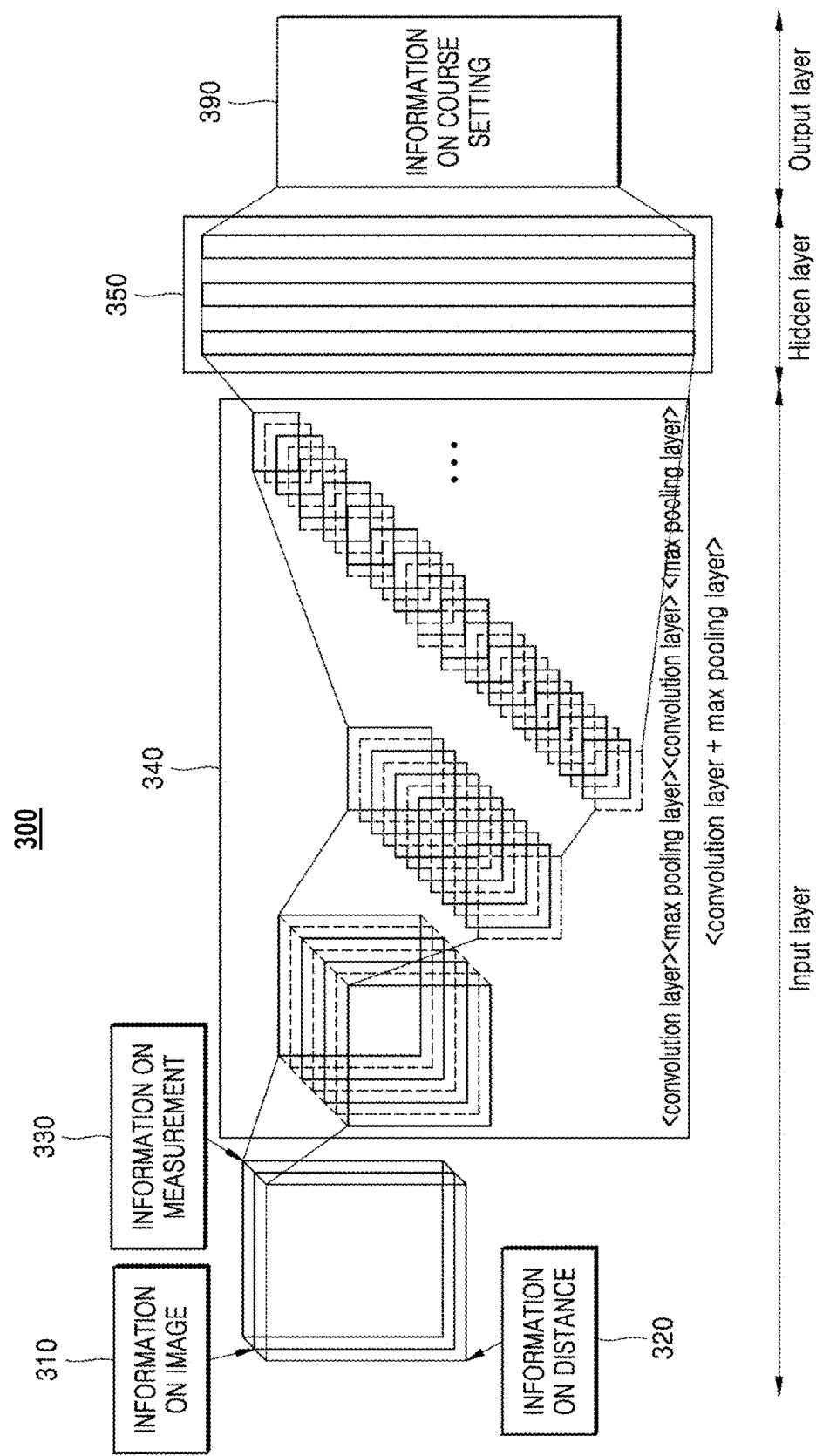
FIG. 12 shows a configuration of a learning unit according to an embodiment of the present invention.

FIG. 12 shows a configuration of a learning unit 300 according to an embodiment of the present invention. The learning unit 300 may implement the learning unit 130 of the washing machine 100 in FIG. 2 and/or the learning unit 230 of the cloud server 200 in FIG. 7.

The learning unit 300 may implement a machine-learning network, such as an artificial neural network, that consists of a series of layers of nodes. The output of each network layer is used as input to the next network layer. Each layer of the network generates an output from a received input in accordance with values of a respective set of parameters or factors. In some examples, the learning unit 300 may implement deep learning using one or more input layers, one or more hidden layers, and one or more output layers, and after performing learning, outputs information at the output layer(s) in response to the input layer(s).

The input layer sets information on distances in the input node 320 (e.g. a depth image), information on images in the input node 310 (e.g. an RGB image or a grayscale image), and information on measurements in the input node 330 (e.g. information on wash administration or physical/electrical information on measurements) as an input factor of an input node.

As in FIGS. 8 to 10, a convolution layer to which a convolution filter is applied, and a max polling layer to which a max pooling filter is applied, are repeatedly applied to an image so as to extract features appropriate for learning from the information on images in the input node 310 or other input information, and the features may be set as an input node of a hidden layer 350, such as the input node 340. That is, a convolution filter or a max pooling filter may be applied not only to information on images but also to information on distances and measurements.

As in FIG. 8, a convolution layer is a layer obtained through convolution in which all the input data is shifted to a constant size at a constant kernel size. A max polling layer is a layer that has a maximum value in a kernel while shifting an input date obtained from a convolution layer to a constant kernel size at a constant size. The convolution layer and the max pooling layer may be alternately arranged, and in doing so, features in the information on images, distances, and/or measurements may be highlighted.

In FIG. 12, three types of information may be an input factor converted into the form of a matrix, and a finally predicted model may be formed through a convolution neural network that was learned during the learning.

As an example, a neural network using weight and bias as a parameter is a hidden layer 350. The softmax function is used for an output layer, and the height index as a probability value among four types of results (a normal state, water splash, unbalanced power off, twisted or knotted laundry) is produced and applied to information on setting of a course or produced as a predicted value for laundry.

An output node 390 may use set information on course setting as an output factor. A hidden layer 350 may be arranged between an input layer and an output layer so as to react to a relationship between the set information on course setting and input factors.

The hidden layer 350 may have one or more layers between the input nodes 310, 320, 330, or 340 and the output node 390.

A hidden layer and a link or bias arranged in each input/output factor or weight of each link may be generated during learning, and the hidden layer, link, bias, weight may store information updated from the outside. That is, weight or bias of nodes and edges constituting a hidden layer between an input node and an output node is updated during learning.

For example, the learning unit 130 in a washing machine 100 may perform learning in the washing machine 100, receive weight or a bias value of nodes and edges of a hidden layer constituting the learning unit 130 from the outside and update the same.

As another example, the cloud server 200 may receive learning factors (input factors, output factors) from a plurality of washing machines and allow the learning unit 230 to learn. Further, the cloud server 200 may continue to input learning factors provided by a plurality of washing machines to the learning unit 230 and update the learning unit 230.

Updating includes an update, performed by the learning unit 300 (e.g., learning unit 130 and/or learning unit 230), of weight of nodes and edges constituting a hidden layer between an input node and an output node during learning. When data for an input and an output increases, an update may be exactly performed. Such an update means learning performed by the learning unit 300.

After an update, the learning unit 300 (e.g., learning unit 130 in the washing machine 100 or the learning unit 230 of the cloud server 200) may produce information on course setting of an output node in response to a predetermined input. That is, when the information on distances in the input node 320, the information on images in the input node 310, and the information on measurements in the input node 330 are input to the learning unit 300, the hidden layer 350 processes these pieces of information, and an output node 390 of an output layer produces specific value (a value indicating information on setting of a specific course) in accordance with finally input information.

According to an embodiment, the washing machine 100 produces information on course setting adequate for laundry on the basis of the height, image and weight of the laundry, physical or electrical information generated during a wash or receives the information on course setting adequate for laundry from the cloud server and operates. The washing machine 100 includes a learning unit 130 that produces information on course setting adequate for specific laundry. The learning unit 130 extracts and learns features from information on the volume and image of laundry and information measured in the washing machine 100 and produces information on course setting on the basis of the results of learning. Additionally, the washing machine 100 predicts or confirms water splash or a state in which laundry is placed eccentrically as a result of learning on the basis of information on features of the laundry and controls operation of the washing machine.

According to an embodiment, the cloud server 200 receives, from a plurality of washing machines 100, information on the height, image and weight of laundry, physical or electrical information generated during a wash. The cloud server 200 applies the received information to the learning unit 230, produces information on setting of a wash course adequate for the laundry and provides the information on setting of a wash course to each washing machine 100.

According to embodiments of the present disclosure, the washing machine 100 and/or the cloud server 200 may learn information on distances, images and measurements, recognize a load (laundry) put into the washing machine and set a course adequate for the load, thereby making it possible to enhance efficiency and convenience. To this end, the washing machine 100 and/or the cloud server 200 performs learning. The washing machine 100 and/or the cloud server 200 may learn information on laundry obtained by the distance sensor and image sensor that capture the inside of the tub, information on measurements and information on a course set by the user (information on the selection of a menu) and, when the washing machine washes laundry similar to the learned laundry, automatically set a course adequate for the laundry.

Additionally, the washing machine 100 and/or the cloud server 200 may recognize a special load (e.g., a stuffed doll, padded clothing, a duvet, and the like) that greatly affects water supply, time, vibration or noise during a wash through learning, automatically set a wash course (e.g., a water supply mode, a wash mode) adequate for the special load and may deal with various problems (e.g., water splash, unbalanced power off). Even when the user does not select a specific course for specific laundry, the washing machine 100 and/or the cloud server 200 may automatically set a course for specific laundry, thereby making it possible to reduce energy consumption, enhance water efficiency and improve a dehydration function of the washing machine, and the like.

Even if it was described above that all of the components of an embodiment of the present disclosure are coupled as a single unit or coupled to be operated as a single unit, the present disclosure is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by a person skilled in the technical field of the present disclosure. Such a computer program may implement the embodiments of the present disclosure by being stored in a computer readable storage medium, and being read and executed by a computer. A magnetic recording medium, an optical recording medium, a carrier wave medium, or the like may be employed as the storage medium. Also, a computer program to implement an embodiment of the present disclosure may include a program module that is transmitted in real time via an external device.

What is claimed is:

1. A washing machine configured to implement a plurality of functions based on object sensing, the washing machine comprising:
  a washing function unit that includes a tub, a drum, and a motor and that is configured to perform physical and electrical functions for storing and washing of laundry;
  a distance sensor configured to obtain a height of the laundry in the washing function unit based on a distance to the laundry, wherein the distance sensor is disposed at an upper portion or at a lateral portion of the washing function unit;
  an image sensor configured to sense an image of the laundry, wherein the image sensor is disposed at the upper portion or at the lateral portion of the washing function unit;
  at least one processor; and
  at least one computer memory operably connectable to the at least one processor and storing instructions that, when executed, cause the at least one processor to perform operations comprising:
    obtaining measurement information regarding at least one of (i) a weight of the laundry, (ii) physical information generated during the washing of the laundry, or (iii) electrical information generated during the washing of the laundry; and
    controlling the washing function unit based on course setting information that is produced by a machine-learning network in accordance with (i) distance information obtained by the distance sensor, (ii)

image information obtained by the image sensor, and
(iii) the measurement information.

2. The washing machine of claim 1, wherein the machine-learning network is configured to perform machine learning by using (i) at least one input factor that comprises the distance information, the image information, and the measurement information that was produced during at least one prior washing of laundry, and (ii) at least one output factor that comprises the course setting information that was produced during the at least one prior washing of laundry, and
wherein the machine-learning network is configured to:
determine whether the laundry satisfies at least one criterion based on the distance information, the image information, and the measurement information; and
based on the laundry satisfying the at least one criterion, produce the course setting information for the laundry.

3. The washing machine of claim 1, wherein the machine-learning network comprises:
at least one input layer configured to set the distance information, the image information, and the measurement information as at least one input factor of at least one input node;
at least one output layer configured to set the course setting information as at least one output factor of at least one output node; and
at least one hidden layer configured to be arranged between the at least one input layer and the at least one output layer,
wherein the machine-learning network is configured to update at least one of a weight or a bias of nodes and edges in the at least one hidden layer during learning.

4. The washing machine of claim 1, further comprising a communication unit,
wherein the machine-learning network is implemented in at least one server outside the washing machine, and
wherein the operations further comprise:
transmitting, through the communication unit to the at least one server, the distance information, the image information, and the measurement information produced during the washing of the laundry;
receiving, through the communication unit and from the at least one server, and based on the laundry satisfying at least one criterion, the course setting information for the laundry; and
controlling at least one operation of the washing function unit based on the received course setting information.

5. The washing machine of claim 1, wherein based on a determination that the laundry satisfies at least one criterion related to a weight of the laundry being less than a threshold weight and a volume of the laundry exceeding a threshold volume according to the distance information, the image information, and the measurement information:
controlling the washing function unit based on the course setting information comprises:
controlling the washing function unit according to a course setting for preventing water splash.

6. The washing machine of claim 1, wherein based on a determination that the laundry satisfies at least one criterion related to the laundry being placed eccentrically in the washing function unit according to the distance information, the image information, and the measurement information:
controlling the washing function unit based on the course setting information comprises:

controlling the washing function unit according to a course setting for evenly distributing the laundry in the washing function unit.

7. The washing machine of claim 1, wherein the course setting information is produced by the machine-learning network by extracting one or more features of the laundry from at least one of the distance information, the image information, or the measurement information using at least one of a convolution filter or a max-pooling filter.

8. At least one server that is configured to set functions for at least one of a plurality of washing machines based on object sensing, the at least one server comprising:
a communication unit;
at least one processor; and
at least one computer memory operably connectable to the at least one processor and storing instructions that, based on being executed by the at least one processor, perform operations comprising:
receiving, through the communication unit and from a washing machine among the plurality of washing machines, (i) distance information related to a height of laundry in the washing machine, (ii) image information related to at least one image of the laundry in the washing machine, and (iii) measurement information related to at least one of a weight of the laundry, physical information generated during washing of the laundry, or electrical information generated during the washing of the laundry in the washing machine;
using a machine-learning network to process the distance information, the image information, and the measurement information to generate course setting information for the washing machine;
transmitting, through the communication unit and to the washing machine, the course setting information that was produced by the machine-learning network; and
monitoring, on the transmitted course setting information, delay in operations of the washing machine.

9. The at least one server of claim 8, wherein the machine-learning network is configured to perform machine learning by using (i) at least one input factor that comprises the distance information, the image information, and the measurement information that was produced during at least one prior washing of laundry by at least one washing machine among the plurality of washing machines, and (ii) at least one output factor that comprises the course setting information that was produced during the at least one prior washing of laundry, and
wherein the machine-learning network is configured to:
determine whether the laundry satisfies at least one criterion based on the distance information, the image information, and the measurement information; and
based on the laundry satisfying the at least one criterion, produce the course setting information for the laundry.

10. The at least one server of claim 8, wherein the machine-learning network of the at least one server comprises:
at least one input layer that is configured to set the distance information, the image information, and the measurement information as at least one input factor of at least one input node;
at least one output layer that is configured to set the course setting information as at least one output factor of at least one output node; and at least one hidden layer that is configured to be arranged between the at least one input layer and the at least one output layer,
wherein the machine-learning network is configured to update at least one of a weight or a bias of nodes and edges in the at least one hidden layer during learning.

11. The at least one server of claim 8, wherein using the machine-learning network to process the distance information, the image information, and the measurement information to generate the course setting information for the washing machine comprises:
based on a determination that the laundry in the washing machine satisfies at least one criterion related to a weight of the laundry being less than a threshold weight and a volume of the laundry exceeding a threshold volume according to the distance information, the image information, and the measurement information received from the washing machine:
producing the course setting information related to a course setting for preventing water splash in the washing machine.

12. The at least one server of claim 8, wherein using the machine-learning network to process the distance information, the image information, and the measurement information to generate the course setting information for the washing machine comprises:
based on a determination that the laundry satisfies at least one criterion related to the laundry being placed eccentrically in the washing machine according to the distance information, the image information, and the measurement information received from the washing machine:
producing the course setting information related to a course setting for evenly distributing the laundry in the washing machine.

13. The at least one server of claim 8, wherein the course setting information is produced by the machine-learning network by extracting one or more features of the laundry from at least one of the distance information, the image information, or the measurement information using at least one of a convolution filter or a max-pooling filter.

* * * * *